United States Patent
Suzuki

(10) Patent No.: US 9,594,291 B2
(45) Date of Patent: Mar. 14, 2017

(54) LENS APPARATUS AND IMAGE PICKUP APPARATUS INCLUDING THE SAME

(71) Applicant: CANON KABUSHIKI KAISHA, Tokyo (JP)

(72) Inventor: Junichi Suzuki, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/625,961

(22) Filed: Feb. 19, 2015

(65) Prior Publication Data

US 2015/0160535 A1 Jun. 11, 2015

Related U.S. Application Data

(62) Division of application No. 13/424,453, filed on Mar. 20, 2012, now abandoned.

(30) Foreign Application Priority Data

Mar. 23, 2011 (JP) ................. 2011-064163

(51) Int. Cl.
   *G03B 13/16* (2006.01)
   *H04N 5/232* (2006.01)
   (Continued)

(52) U.S. Cl.
   CPC ............. *G03B 13/16* (2013.01); *G03B 13/36* (2013.01); *H04N 5/2254* (2013.01);
   (Continued)

(58) Field of Classification Search
   CPC .... G03B 13/16; G03B 13/36; H04N 5/23245; H04N 5/2254; H04N 5/23222; H04N 5/23212; H04N 5/23293
   (Continued)

(56) References Cited

U.S. PATENT DOCUMENTS 7,973,851 B2 *  7/2011  Yajima ................. 348/346
8,237,799 B2    8/2012  Sugino
(Continued)

FOREIGN PATENT DOCUMENTS

JP  2006317585  * 11/2006
JP  2008129371 A  6/2008
(Continued)

OTHER PUBLICATIONS

Japanese Office Action issued in Appln. No. 2011-064163 on Dec. 18, 2014. Cited in parent U.S. Appl. No. 13/424,453.
(Continued)

*Primary Examiner* — Albert Cutler
(74) *Attorney, Agent, or Firm* — Rossi, Kimms & McDowell LLP

(57) ABSTRACT

A lens apparatus includes a focus lens, a focus detector, an automatic focusing unit configured to drive the focus lens based on a focus detection result obtained from the focus detector, a focus information output unit configured to output focus information to a display unit capable of displaying the focus information superimposed on a picked up image obtained by picking up an image with use of a light beam from an object, which passes through the lens apparatus, and a display determination unit configured to determine whether or not to display the focus information on the display unit, in which the focus information output unit is configured to output a signal for displaying the focus information to the display unit based on a determination result obtained from the display determination unit.

14 Claims, 13 Drawing Sheets

(51) Int. Cl.
*H04N 5/225* (2006.01)
*G03B 13/36* (2006.01)

(52) U.S. Cl.
CPC ..... *H04N 5/23212* (2013.01); *H04N 5/23222* (2013.01); *H04N 5/23245* (2013.01); *H04N 5/23293* (2013.01)

(58) Field of Classification Search
USPC .......................................................... 348/346
See application file for complete search history.

(56) References Cited

U.S. PATENT DOCUMENTS

| | | | | |
|---|---|---|---|---|
| 8,629,914 | B2* | 1/2014 | Kuriyama | G02B 7/36 348/222.1 |
| 8,717,478 | B2* | 5/2014 | Shiohara | 348/333.02 |
| 2006/0029381 | A1* | 2/2006 | Onozawa | 396/147 |
| 2009/0201409 | A1 | 8/2009 | Moriya | |
| 2010/0289937 | A1* | 11/2010 | Hada | G03B 13/00 348/333.01 |
| 2011/0221952 | A1* | 9/2011 | Hamada et al. | 348/345 |

FOREIGN PATENT DOCUMENTS

| | | |
|---|---|---|
| JP | 2009194523 A | 8/2009 |
| JP | 2010141728 A | 6/2010 |
| JP | 2010226588 A | 10/2010 |

OTHER PUBLICATIONS

Final Office Action issued in parent U.S. Appl. No. 13/424,453, dated Nov. 21, 2014.

Non Final Office Action issued in parent U.S. Appl. No. 13/424,453, dated Jun. 16, 2014.

* cited by examiner

FIG. 2

| MODE | DETAIL |
|---|---|
| A | CONSTANTLY AF OPERATION |
| B | AF OPERATION ONLY WHEN AF SWITCH IS ON |
| C | NO AF OPERATION |

FIG. 3

| FOCUS STATE | DETAIL |
|---|---|
| + + | OUT OF FOCUS SIGNIFICANTLY IN CLOSE SIDE |
| + | OUT OF FOCUS IN CLOSE SIDE |
| 0 | IN-FOCUS |
| − | OUT OF FOCUS IN INFINITY SIDE |
| − − | OUT OF FOCUS SIGNIFICANTLY IN INFINITY SIDE |

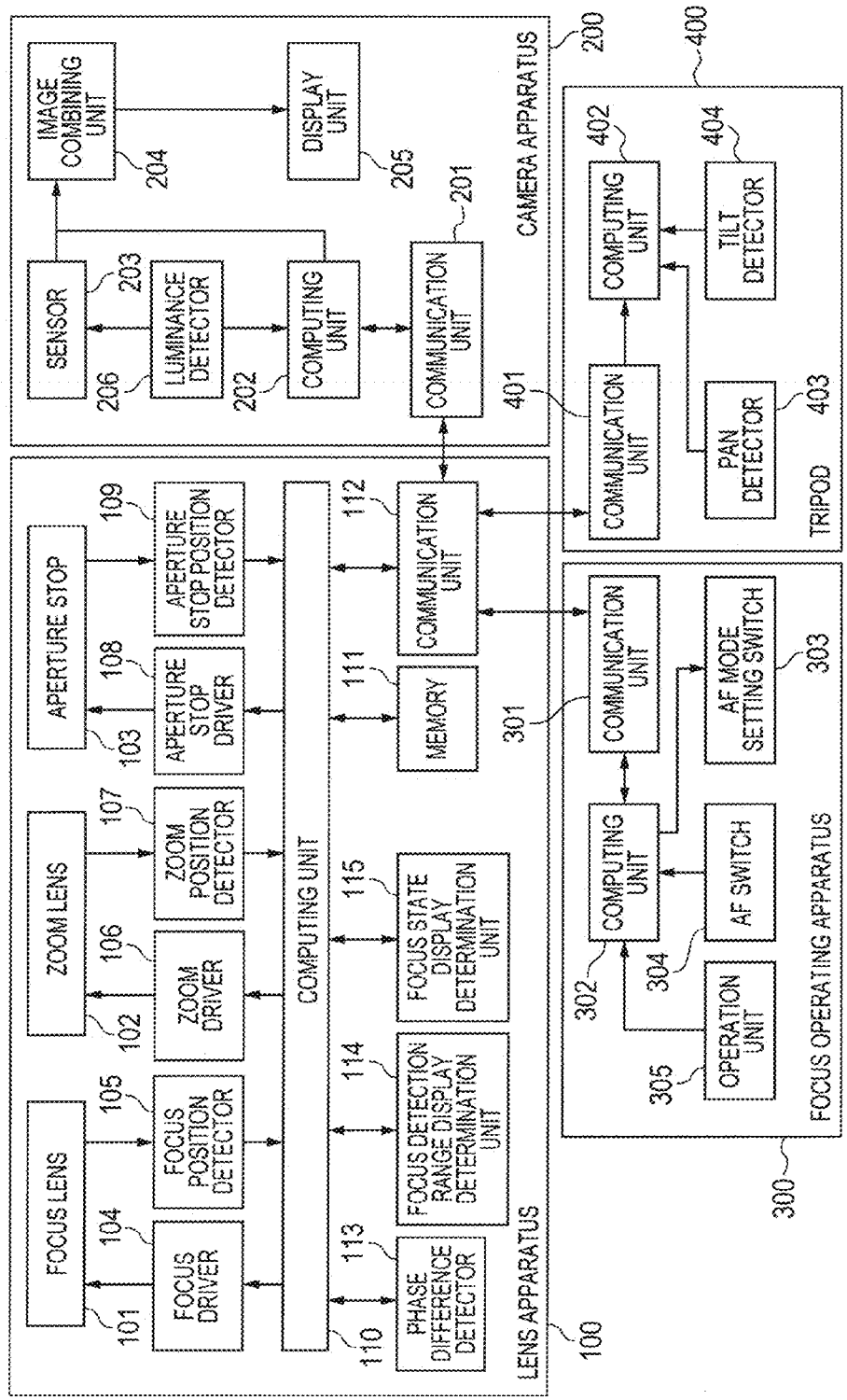

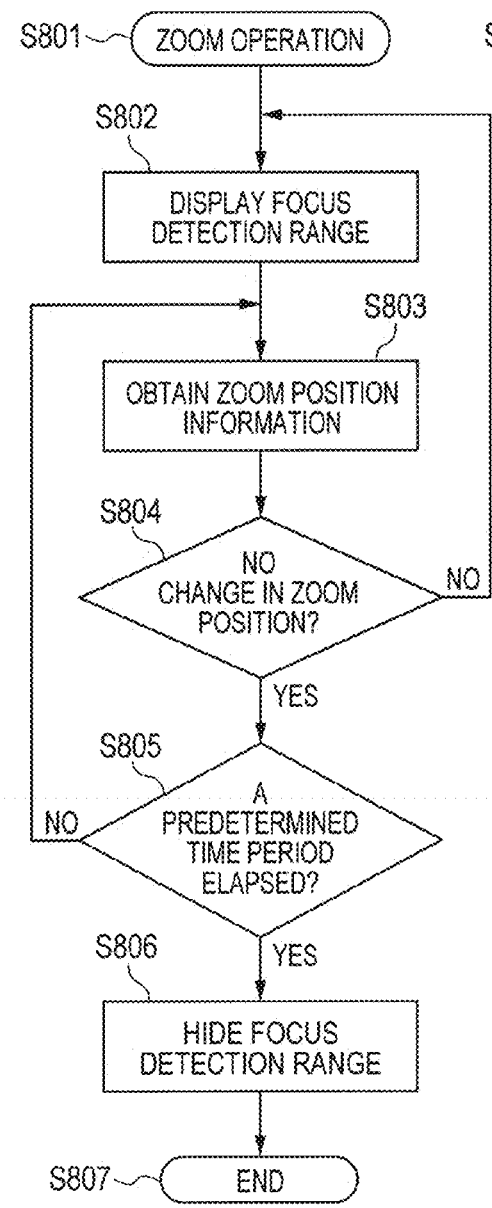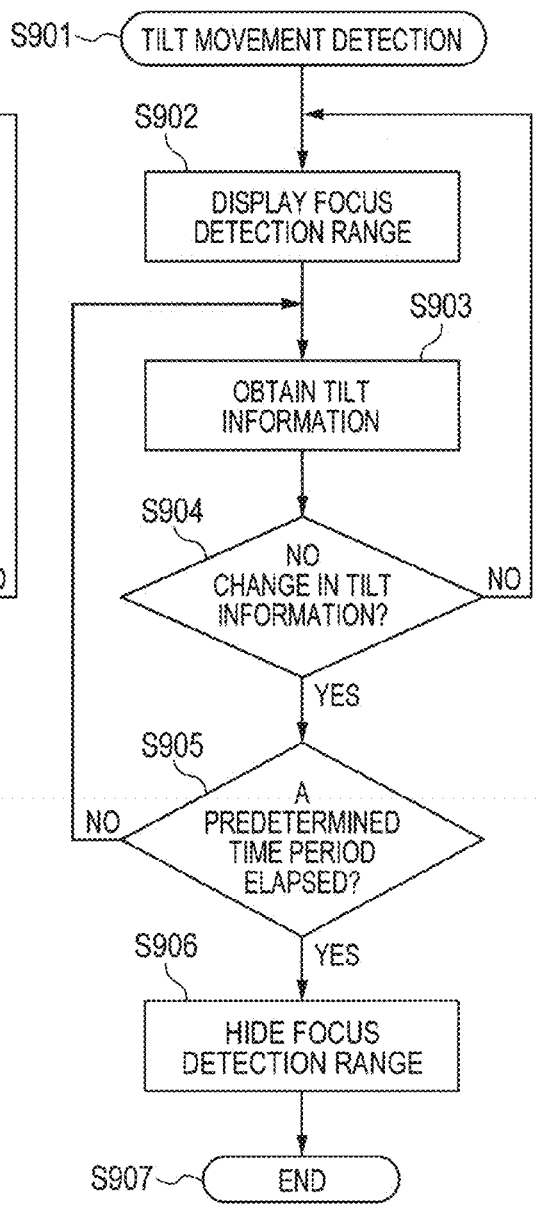

FIG. 11A

```
JudgeSelect
Zoom:    ON
Pan:     OFF
Tilt:    ON
AF:      ON
Target:  ON
Ext:     OFF
Time:    ON
```

FIG. 11B

| ITEM | DETAIL | STATUS |
|---|---|---|
| Zoom | DETERMINE WHETHER OR NOT ZOOMING IS PERFORMED | ON |
| Pan | DETERMINE WHETHER OR NOT PANNING IS PERFORMED | OFF |
| Tilt | DETERMINE WHETHER OR NOT TILTING IS PERFORMED | ON |
| AF | DETERMINE WHETHER OR NOT IT IS IN AF OPERATION | ON |
| Target | DETERMINE WHETHER OR NOT LUMINANCE OF OBJECT IS CHANGED | ON |
| Ext | DETERMINE WHETHER OR NOT THE EXTENDER IS CHANGED | OFF |
| Time | DETERMINE WHETHER OR NOT A PREDETERMINED TIME PERIOD ELAPSED | ON |

FIG. 12

| ITEM | DETAIL |
|---|---|
| ON | CONSTANTLY DISPLAY THE FOCUS RANGE DISPLAY AND FOCUS DISPLAY |
| Situation | CONTROL DISPLAYING ACCORDING TO THE SHOOTING CONDITION |
| OFF | CONSTANTLY HIDE THE FOCUS RANGE DISPLAY AND FOCUS DISPLAY |

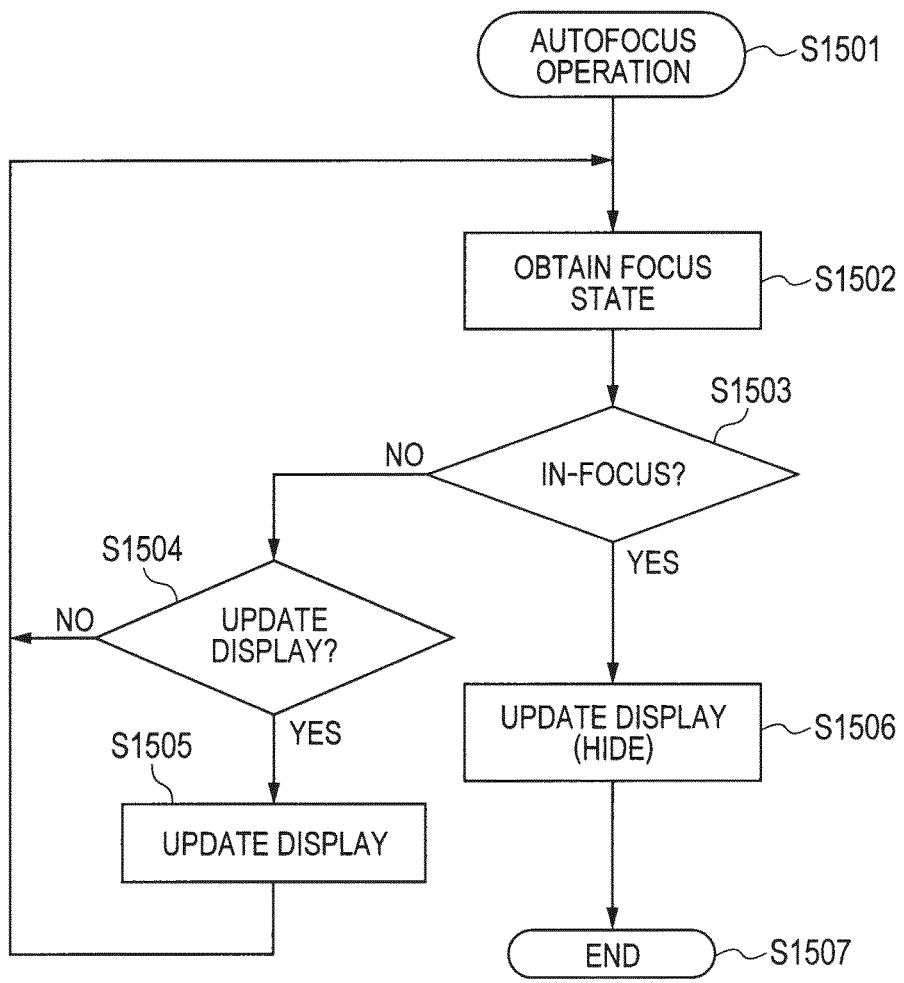

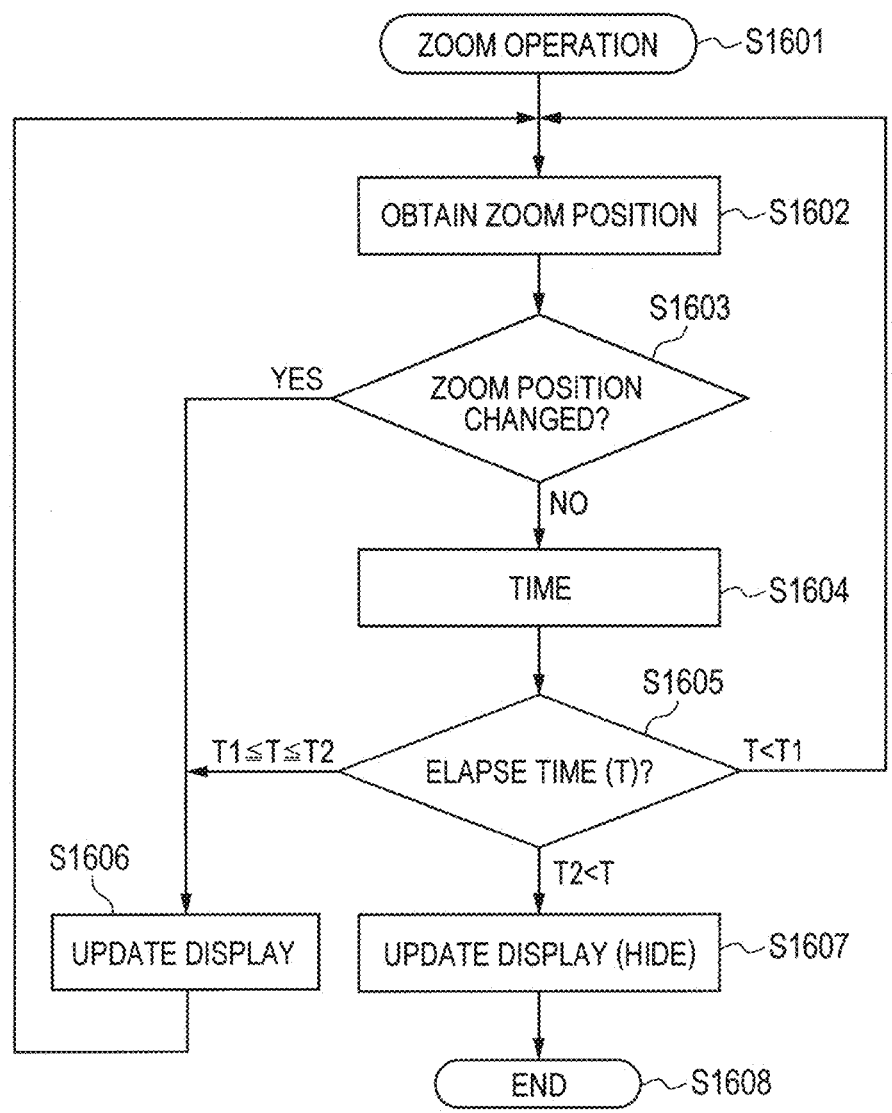

LENS APPARATUS AND IMAGE PICKUP APPARATUS INCLUDING THE SAME

BACKGROUND OF THE INVENTION

Field of the Invention

The present invention relates to an optical apparatus such as a television lens system and a video lens system, and more particularly, to an image pickup apparatus including a lens apparatus and a camera apparatus.

Description of the Related Art

An image pickup system to be used in a television image pickup situation includes a television lens system (hereinafter, referred to as "lens apparatus") and a television camera (hereinafter, referred to as "camera apparatus"). As the lens apparatus, there are known a lens apparatus including a manual focusing mechanism for moving a focus lens through an operation by a user himself/herself, and a lens apparatus including an automatic focusing function for moving the focus lens using an image signal from an image pickup device, such as a CCD, so that an object becomes in focus. In the camera apparatus, there is mounted a monitor (viewfinder) for displaying a real-time image that is currently picked up. The lens apparatus including the automatic focusing function is configured to output information on the automatic focusing function to the camera apparatus in response to an instruction from a controller connected to the lens apparatus so that the output information is superimposed on an object image on the camera side and is displayed on the viewfinder. Examples of the information on the automatic focusing function include a focus detection range indicating a range of focus detection in an image pickup range, and a focus state indicating a degree of focusing. The information on the automatic focusing function is herein referred to as autofocus information or focus information.

The user may easily confirm the autofocus information through the viewfinder during the image pickup operation. However, in a case of using a controller having no display instruction unit for instructing the autofocus information to be displayed on the viewfinder, the autofocus information cannot be displayed.

Conventionally, there has been required a technology of displaying the autofocus information independently of the controller.

For example, Japanese Patent Application Laid-Open No. 2009-194523 discloses a technology in which, when it is determined that the controller has no display instruction unit, the autofocus information is output to the camera and the output information is displayed.

However, the conventional technology disclosed in Japanese Patent Application Laid-Open No. 2009-194523 has a problem in that the autofocus information is constantly displayed even in a case where the user wishes to avoid displaying the autofocus information, and hence the autofocus information cannot be hidden when not needed. The viewfinder originally serves to display a real-time object image that is currently picked up, and hence when the information superimposed on the object image, such as the focus detection range and the focus state, is constantly displayed, the user may feel inconvenience depending on an image pickup situation. Further, the controller may include a switch for display switching, but in an image pickup situation in which a strict operation is required as in the television image pickup situation, the user may wish to concentrate on field angle adjustment and focusing rather than the display switching. Further, as described above, there is a case where the controller does not have the switch for display switching, and hence it is desired that whether or not to display the information be determined based on an autofocus operation status and an object status, and the display be automatically switched so that the information is displayed when needed and hidden when not needed.

SUMMARY OF THE INVENTION

It is therefore an object of the present invention to provide an image pickup apparatus capable of displaying autofocus information as appropriate without causing a user to feel inconvenience.

In order to achieve the above-mentioned object, there is provided a lens apparatus according to an exemplary embodiment of the present invention, including: a focus lens; a focus detector; an automatic focusing unit configured to drive the focus lens based on a focus detection result obtained from the focus detector; a focus information output unit configured to output focus information to a display unit capable of displaying the focus information superimposed on a picked up image obtained by picking up an image with use of a light beam from an object, which passes through the lens apparatus; and a display determination unit configured to determine whether or not to display the focus information on the display unit, in which the focus information output unit is configured to output a signal for displaying the focus information to the display unit based on a determination result obtained from the display determination unit.

According to the present invention, it is possible to provide the image pickup apparatus capable of displaying the autofocus information as appropriate without causing the user to feel inconvenience.

Further features of the present invention will become apparent from the following description of exemplary embodiments with reference to the attached drawings.

BRIEF DESCRIPTION OF THE DRAWINGS

FIG. 2 is a table showing autofocus operation modes according to the present invention.

FIG. 3 is a table showing a display method for a focus state according to the present invention.

FIG. 6 is a block diagram illustrating a configuration according to a second embodiment of the present invention.

FIG. 8 is a flow chart at the time of a zoom operation according to the second embodiment of the present invention.

FIG. 9 is a flow chart at the time of tilting according to the second embodiment of the present invention.

FIG. 11A is an illustration of an example of a display determination selecting unit to be used in the third embodiment of the present invention.

FIG. 11B is a table showing the example of the display determination selecting unit to be used in the third embodiment of the present invention.

FIG. 12 is a table showing a display method for autofocus information to be used in the third embodiment of the present invention.

FIG. 15 is a flow chart at the time of an autofocus operation according to the third embodiment of the present invention.

FIG. 16 is a flow chart at the time of a zoom operation according to the third embodiment of the present invention.

DESCRIPTION OF THE EMBODIMENTS

Hereinafter, exemplary embodiments of the present invention are described in detail with reference to the attached drawings.

(First Embodiment)

Hereinafter, referring to FIGS. 1 to 5, an image pickup apparatus according to a first embodiment of the present invention is described.

Figure 1:
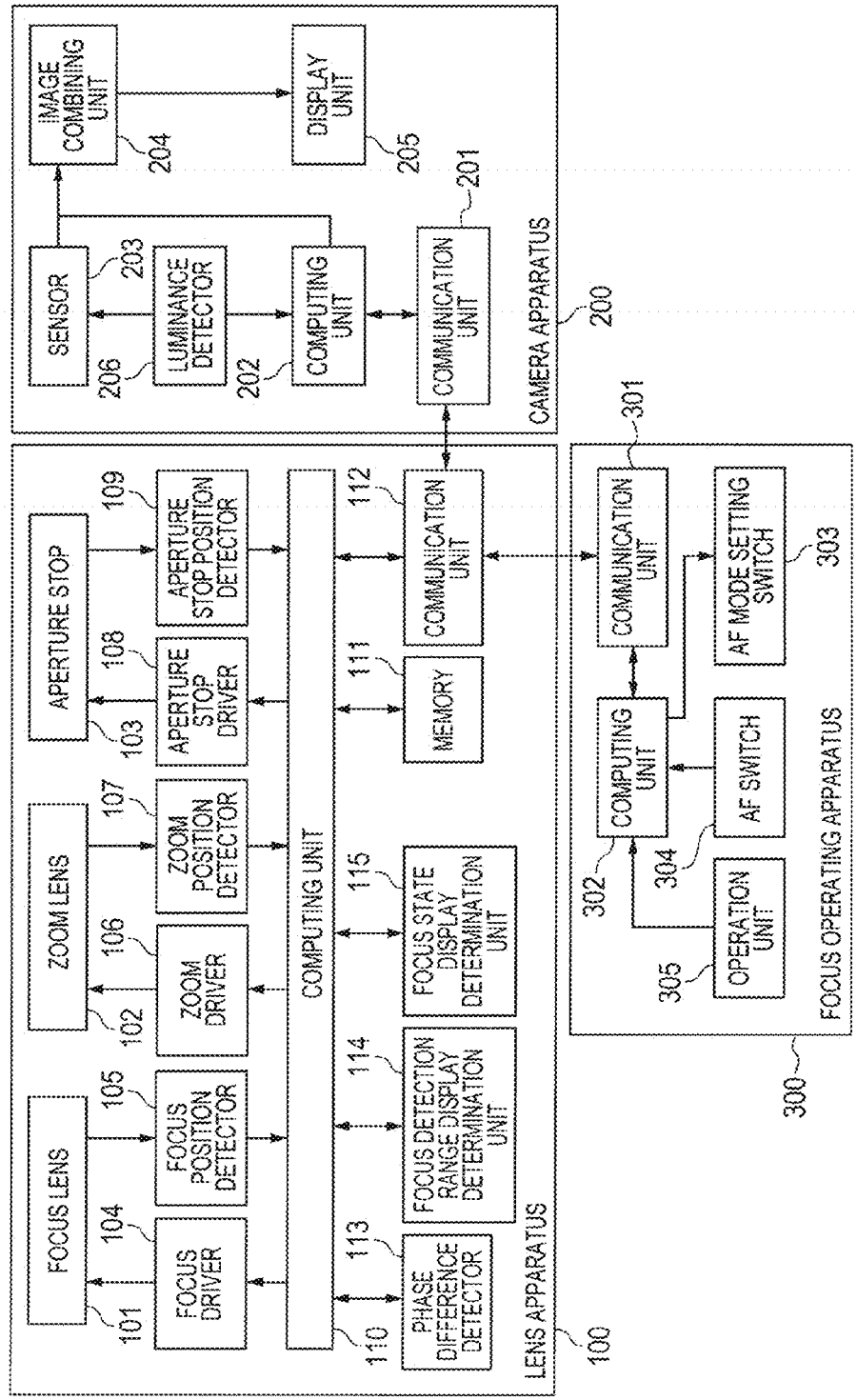
FIG. 1 is a block diagram illustrating a configuration according to a first embodiment of the present invention.

FIG. 1 is a functional block diagram of an image pickup system according to this embodiment. The image pickup apparatus according to the present invention includes a lens apparatus 100, a camera apparatus 200 removably connected to the lens apparatus 100, and a focus operating apparatus (controller) 300 serving as an operation apparatus.

The lens apparatus 100 mainly includes a focus lens 101 for changing an object distance, a zoom lens 102 for changing a focal length, an aperture stop 103 for adjusting an amount of light, a computing unit 110, a memory 111, a communication unit 112, a phase difference detector 113, a focus detection range display determination unit 114, and a focus state display determination unit 115.

A focus driver 104 for driving the focus lens 101, and a focus position detector 105 for detecting a position of the focus lens 101 are connected to the focus lens 101. A zoom driver 106 for driving the zoom lens 102, and a zoom position detector 107 for detecting a position of the zoom lens 102 are connected to the zoom lens 102. Further, an aperture stop driver 108 for driving the aperture stop 103, and an aperture stop position detector 109 for detecting a position of the aperture stop 103 are connected to the aperture stop 103. The focus position detector 105, the zoom position detector 107, and the aperture stop position detector 109 each include an encoder or a potentiometer. The encoder of the zoom position detector 107 outputs a pulse signal to the computing unit 110 along with the drive of the zoom lens 102.

The computing unit 110 outputs a drive signal to the focus driver 104 so as to drive the focus lens 101. Similarly, the computing unit 110 outputs a drive signal to the zoom driver 106 so as to drive the zoom lens 102, and outputs a drive signal to the aperture stop driver 108 so as to drive the aperture stop 103. Further, the computing unit 110 outputs drive information of the focus lens 101 and the zoom lens 102 to the focus detection range display determination unit 114 and the focus state display determination unit 115, and outputs, to the communication unit 112, determination results input from the focus detection range display determination unit 114 and the focus state display determination unit 115.

The communication unit 112 (focus information output unit) communicates to the camera apparatus 200 and the focus operating apparatus 300. The communication unit 112 transmits an input from the computing unit 110 to the camera apparatus 200, and outputs an input from the camera apparatus 200 to the computing unit 110. Further, the communication unit 112 outputs a focus lens position signal from the computing unit 110 to the focus operating apparatus 300, and outputs a focus lens drive signal from the focus operating apparatus 300 to the computing unit 110.

The phase difference detector 113 serving as a focus detector is a phase difference sensor, and outputs phase difference data obtained through detection (focus detection result) to the computing unit 110. The phase difference detector 113, the focus lens 101, the focus driver 104, the focus position detector 105, and the computing unit 110 constitute an automatic focusing unit (AF unit).

The focus detection range display determination unit 114 determines, based on information input from the computing unit 110, whether or not to display a frame indicating a focus detection range for focusing by an automatic focusing function, and outputs a determination result to the computing unit 110.

The focus state display determination unit 115 determines, based on information input from the computing unit 110, whether or not to display a focus state, and outputs a determination result to the computing unit 110.

The camera apparatus 200 includes a communication unit 201, a computing unit 202, a sensor 203, an image combining unit 204, a display unit 205, and a luminance detector 206.

The communication unit 201 communicates to the lens apparatus 100. The communication unit 201 outputs an input from the lens apparatus 100 to the computing unit 202, and outputs an input from the computing unit 202 to the lens apparatus 100. The computing unit 202 outputs autofocus information from the communication unit 201 to the image combining unit 204, and outputs luminance information from the luminance detector 206 to the communication unit 201. The sensor 203 is an image pickup unit, and outputs, to the image combining unit 204, an image signal (picked up image) obtained by picking up an object image with use of a light beam from an object, which passes through the lens apparatus 100. The image combining unit 204 combines the image signal from the sensor 203 with the autofocus information from the computing unit 202, and outputs the resultant image signal to the display unit 205. The display unit 205 is a display unit for displaying a real-time object image that is currently picked up, and displays the image signal from the image combining unit 204. The luminance detector 206 detects the luminance information with use of the sensor 203, and outputs the luminance information to the computing unit 202.

The focus operating apparatus 300 includes a communication unit 301, a computing unit 302, an AF mode setting switch 303, an AF switch 304, and an operation unit 305. The communication unit 301 communicates to the lens apparatus 100. The communication unit 301 outputs an input from the lens apparatus 100 to the computing unit 302, and outputs an input from the computing unit 302 to the lens apparatus 100. The computing unit 302 performs computation based on information input from the AF switch 304 and the operation unit 305 and an input from the communication unit 301, and outputs a computation result to the communication unit 301. The AF mode setting switch 303 is a switch capable of setting an operation mode of the automatic focusing function (hereinafter, referred to as "autofocus operation mode"). The autofocus operation mode is described later. The AF switch 304 is a switch for switching ON/OFF of the automatic focusing function. The operation unit 305 is an operation unit that allows a user to operate the drive of the focus lens, and when the user performs an input, the operation unit 305 outputs a focus lens drive signal to the computing unit 302.

FIG. 2 is a table showing autofocus operation modes provided to the lens apparatus 100. As illustrated in FIG. 2, Mode A is a mode in which an autofocus operation is constantly performed during an image pickup operation. Mode B is a mode in which the autofocus operation is performed when the AF switch 304 of the focus operating apparatus 300 is turned ON. Mode C is a mode in which the autofocus operation is prohibited. The autofocus operation modes are switchable with use of the AF mode setting switch 303 of the focus operating apparatus 300, and in this embodiment, it is supposed that Mode B is set.

FIG. 3 is a table showing a display method for the focus state to be used in this embodiment. As shown in FIG. 3, the focus state is displayed as "0" under an in-focus state, "+" when the in-focus object distance is on the close side of the object, and "++" when the in-focus object distance is farther on the close side of the object. The focus state is displayed as "−" when the in-focus object distance is on the infinity side of the object, and "−−" when the in-focus object distance is farther on the infinity side of the object.

Figure 4A:
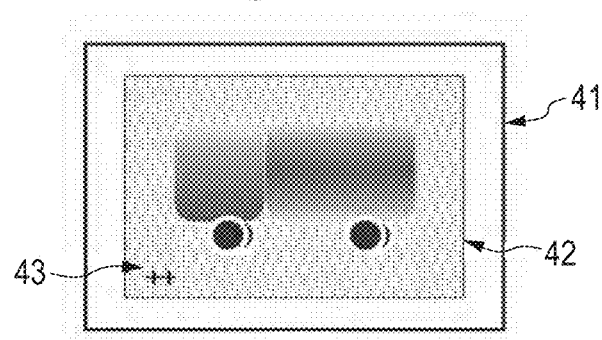
FIG. 4A is an illustration of an image pickup situation as viewed through a viewfinder according to the first embodiment of the present invention.
Figure 4B:
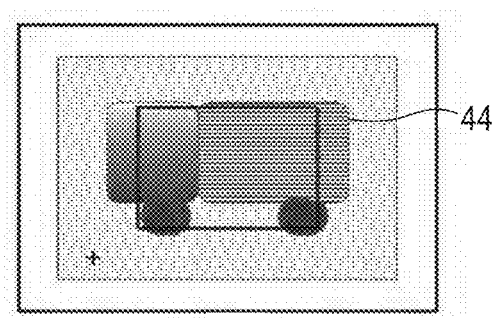
FIG. 4B is an illustration of the image pickup situation as viewed through the viewfinder according to the first embodiment of the present invention.
Figure 4C:
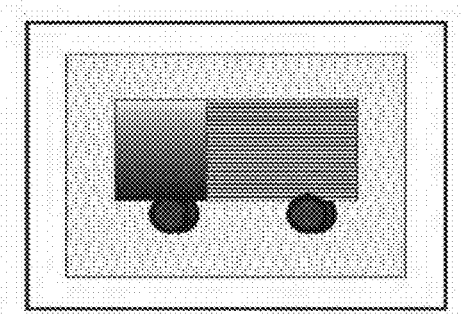
FIG. 4C is an illustration of the image pickup situation as viewed through the viewfinder according to the first embodiment of the present invention.

FIGS. 4A to 4C are illustrations of an image pickup situation as viewed through the display unit 205 of the camera apparatus 200 according to this embodiment.

In FIGS. 4A to 4C, a display unit outer frame is represented by reference numeral 41; a display section, 42; a focus state indication, 43; and a focus detection range indication, 44. The focus state indication 43 is a focus state indication displayed in accordance with the display method shown in FIG. 3. The focus detection range indication 44 indicates an application range of the automatic focusing function, and focus detection is performed in the focus detection range indicated by the focus detection range indication 44. Reference is later made to FIGS. 4A to 4C.

Figure 5:
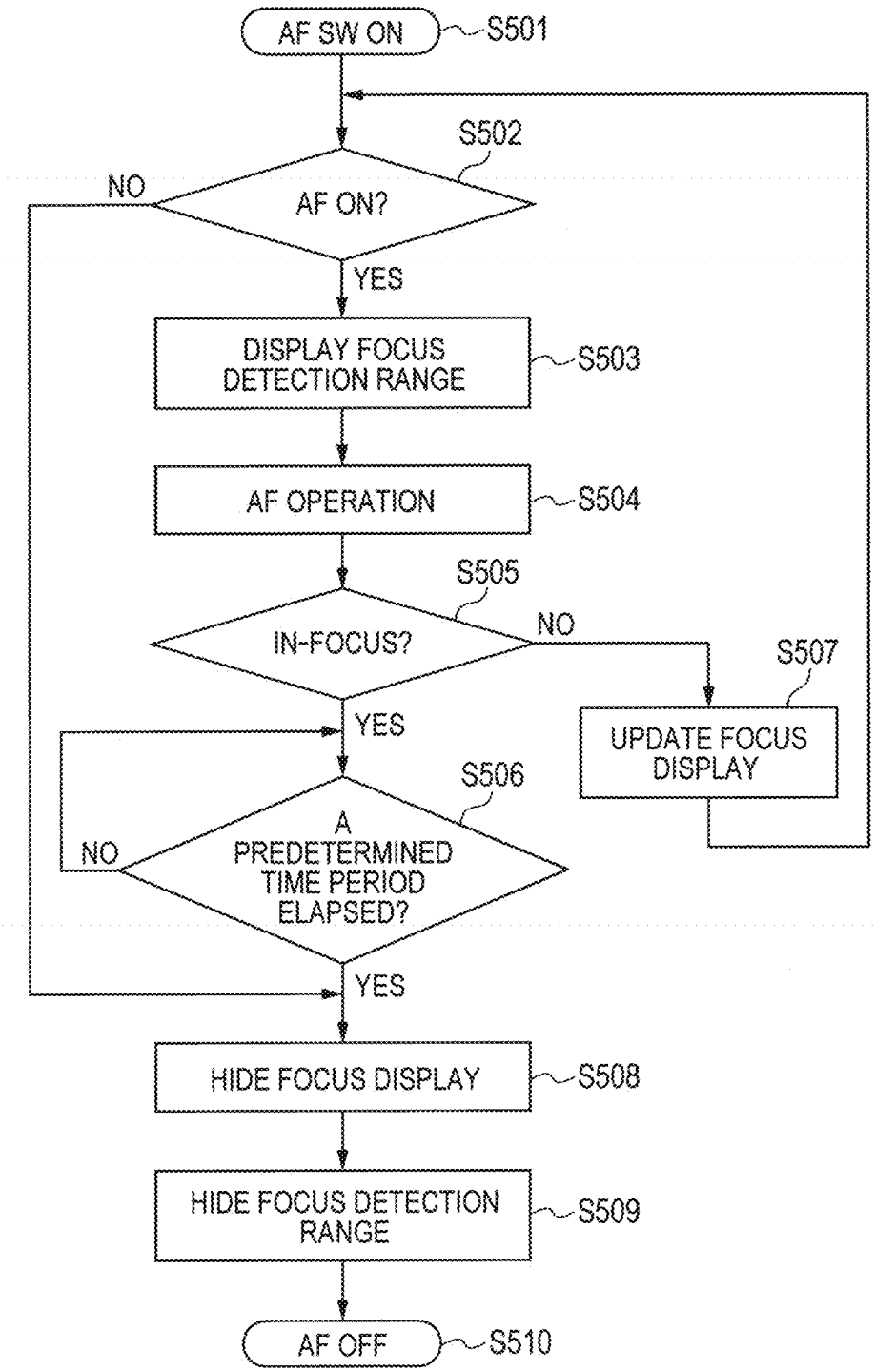
FIG. 5 is a flow chart according to the first embodiment of the present invention.
Figure 7A:
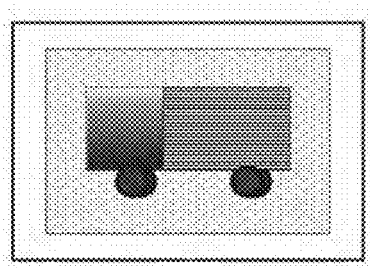
FIG. 7A is an illustration of an image pickup situation as viewed through the viewfinder according to the second embodiment of the present invention.
Figure 7B:
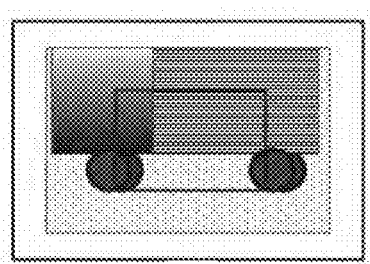
FIG. 7B is an illustration of the image pickup situation as viewed through the viewfinder according to the second embodiment of the present invention.
Figure 7C:
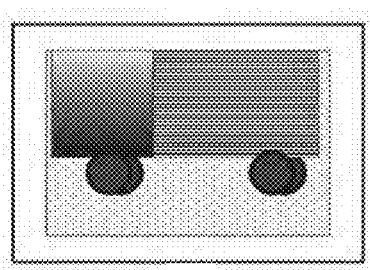
FIG. 7C is an illustration of the image pickup situation as viewed through the viewfinder according to the second embodiment of the present invention.
Figure 7D:
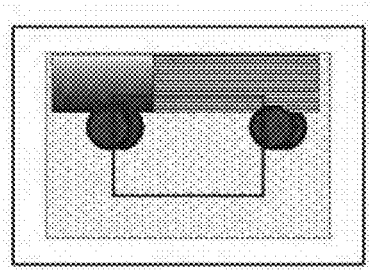
FIG. 7D is an illustration of the image pickup situation as viewed through the viewfinder according to the second embodiment of the present invention.
Figure 7E:
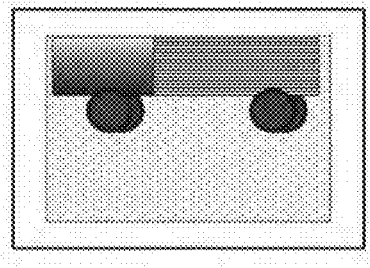
FIG. 7E is an illustration of the image pickup situation as viewed through the viewfinder according to the second embodiment of the present invention.

FIG. 5 is a flow chart of processing to be performed by the lens apparatus 100 according to this embodiment. It is supposed that the image pickup situation displayed on the display unit 205 of the camera apparatus 200 is in a state illustrated in FIG. 4A, in which the object is out of focus.

When the AF switch 304 of the focus operating apparatus 300 is turned ON in Step S501, the processing proceeds to Step S502. In Step S502, the focus detection range display determination unit 114 determines the status of the AF switch 304 of the focus operating apparatus 300. When the status is ON, the focus detection range needs to be displayed, and hence the processing proceeds to Step S503. When the status is not ON, the focus detection range does not need to be displayed, and hence the processing proceeds to Step S508.

In Step S503, a signal is output from the communication unit 112 to the communication unit 201 of the camera apparatus 200 so that the focus detection range is displayed on the display unit 205 of the camera apparatus 200, and the processing proceeds to Step S504. At this time, the display unit 205 of the camera apparatus 200 is brought into a state as illustrated in FIG. 4B, in which the focus detection range to be used in the autofocus operation is displayed. In Step S504, the autofocus operation is performed, and the processing proceeds to Step S505. In Step S505, the focus state display determination unit 115 determines whether or not the object is in focus. When the object is in focus, the processing proceeds to Step S506. When the object is out of focus, the processing proceeds to Step S507.

In Step S506, it is determined whether or not a predetermined time period has elapsed. When the predetermined time period has elapsed, the processing proceeds to Step S508. When the predetermined time period has not elapsed, the processing returns to Step S506.

In Step S507, the focus state indication is updated, and the processing returns to Step S502. The focus state is constantly updated, and a signal is output from the communication unit 112 to the communication unit 201 of the camera apparatus 200 so that the updated focus state is displayed. In Step S508, a signal is output from the communication unit 112 to the communication unit 201 of the camera apparatus 200 so that the focus state is hidden, and the processing proceeds to Step S509. In Step S509, a signal is output from the communication unit 112 to the communication unit 201 of the camera apparatus 200 so that the focus detection range is hidden, and the processing proceeds to Step S510. At this time, the display unit 205 of the camera apparatus 200 is brought into an in-focus state of FIG. 4C. In Step S510, the autofocus operation is finished.

As described above, the lens apparatus determines, based on the autofocus operation status and the focusing status, whether or not to display the autofocus information on the display unit 205, and outputs the autofocus information to the camera apparatus in accordance with the determination result. Thus, the display control for the autofocus information in accordance with the image pickup situation is enabled independently of the operation apparatus. This embodiment is applied in the case of Mode B illustrated in FIG. 2, but may be applied in a case where the automatic focusing is in operation, irrespective of the autofocus operation modes (A/B/C). Further, after the condition is satisfied, the autofocus information is hidden through the elapse of the predetermined time period, but the autofocus information may be hidden with the predetermined time period set to "0", that is, without waiting for the elapse of time after the object becomes in focus. Further, similarly to the focus detection range indication, the focus state indication may be displayed only when the automatic focusing is in operation. In this manner, the present invention is not limited to this embodiment and the combination of the display switching for the focus detection range indication and the display switching for the focus state indication may be changed.

According to this embodiment, the display control for the autofocus information is enabled based on the autofocus operation status and the focusing status, with the result that the operability is improved.

(Second Embodiment)

Hereinafter, referring to FIGS. 2, and 6 to 9, an image pickup apparatus according to a second embodiment of the present invention is described. The components having the same functions as those in the first embodiment are given the same reference symbols and description thereof is therefore omitted.

FIG. 6 is a functional block diagram of an image pickup system according to this embodiment. As compared to FIG. 1 used in the first embodiment, the image pickup system of FIG. 6 is different in that a tripod 400 is connected to the lens apparatus 100, and the communication unit 112 of the lens apparatus 100 further communicates to the tripod 400. The tripod 400 functions as a unit for allowing the lens apparatus 100 to perform a pan movement and a tilt movement, but such a unit is not limited to the tripod, and a support other than the tripod may be used as appropriate.

The tripod 400 includes a communication unit 401, a computing unit 402, a pan detector 403, and a tilt detector 404. The communication unit 401 communicates to the lens apparatus 100. The communication unit 401 outputs information input from the lens apparatus 100 to the computing unit 402, and outputs information input from the computing unit 402 to the lens apparatus 100. The computing unit 402 outputs information input from the pan detector 403 and the tilt detector 404 to the communication unit 401. The pan detector 403 detects the pan movement, and outputs pan information to the computing unit 402. The tilt detector 404 detects the tilt movement, and outputs tilt information to the computing unit 402.

As in the first embodiment, the autofocus operation modes are switchable with use of the AF mode setting switch 303 of the focus operating apparatus 300, and in this embodiment, it is supposed that Mode A (mode in which the automatic focusing is constantly operated) illustrated in FIG. 2 is set.

FIGS. 7A to 7E are illustrations of an image pickup situation as viewed through the display unit 205 of the camera apparatus 200 according to this embodiment.

FIGS. 7A to 7E are arranged in time sequence, and details thereof are described later.

FIG. 8 is a flow chart of processing to be performed by the lens apparatus 100 in a case where a zoom operation is performed according to this embodiment. The image pickup situation displayed on the display unit 205 of the camera apparatus 200 corresponds to a case where the zoom lens is operated under a state of FIG. 7A. When the zoom operation is performed in Step S801, the processing proceeds to Step S802. In Step S802, a signal is output from the communication unit 112 to the communication unit 201 of the camera apparatus 200 so that the focus detection range is displayed, and the processing proceeds to Step S803. At this time, the display unit 205 of the camera apparatus 200 is brought into a state of FIG. 7B. In Step S803, zoom position information is obtained from the zoom position detector 107, and the processing proceeds to Step S804. In Step S804, it is determined whether or not there is no change in position of the zoom lens. When there is no change, the processing proceeds to Step S805. When there is a change, the processing returns to Step S802, and a signal is output from the communication unit 112 to the communication unit 201 of the camera apparatus 200 so that the focus detection range is displayed again on the screen showing the changed zoom position.

In Step S805, it is determined whether or not a predetermined time period has elapsed. When the predetermined time period has elapsed, the processing proceeds to Step S806. When the predetermined time period has not elapsed yet, the processing returns to Step S803, and the zoom position information is obtained again. In Step S806, a signal is output from the communication unit 112 to the communication unit 201 of the camera apparatus 200 so that the focus detection range indication is hidden, and the processing proceeds to Step S807 to finish the processing. At this time, the display unit 205 of the camera apparatus 200 is brought into a state of FIG. 7C.

FIG. 9 is a flow chart of processing to be performed by the lens apparatus 100 in a case where the tilt operation is performed according to this embodiment. The image pickup situation displayed on the display unit 205 of the camera apparatus 200 corresponds to a case where tilting is performed by the tripod under a state of FIG. 7C.

When the tilt operation is performed in Step S901, the processing proceeds to Step S902. In Step S902, a signal is output from the communication unit 112 to the communication unit 201 of the camera apparatus 200 so that the focus detection range indication is displayed, and the processing proceeds to Step S903. At this time, the display unit 205 of the camera apparatus 200 is brought into a state of FIG. 7D. In Step S903, the tilt information is obtained from the tilt detector 404, and the processing proceeds to Step S904. In Step S904, it is determined whether or not there is a change in tilt information thus obtained. When there is no change in tilt information, the processing proceeds to Step S905. When there is a change in tilt information, the processing returns to Step S902, and a signal is output from the communication unit 112 to the communication unit 201 of the camera apparatus 200 so that the focus detection range is displayed again. In Step S905, it is determined whether or not a predetermined time period has elapsed. When the predetermined time period has elapsed, the processing proceeds to Step S906. When the predetermined time period has not elapsed, the processing returns to Step S903, and the tilt information is obtained. In Step S906, a signal is output from the communication unit 112 to the communication unit 201 of the camera apparatus 200 so that the focus detection range is hidden, and the processing proceeds to Step S907 to finish the processing. At this time, the display unit 205 of the camera apparatus 200 is brought into a state of FIG. 7E.

As described above, based on the change in position of the zoom lens of the lens apparatus and the change in tilt information, it is determined whether or not to display the focus detection range indication, and the autofocus information is output to the camera apparatus in accordance with the determination result. Thus, the display control for the autofocus information in accordance with the image pickup situation is enabled independently of the operation apparatus. In this embodiment, the change in position of the zoom lens and the change in tilt information are set as determination conditions, but the present invention is not limited thereto. The display determination may be performed based on information such as a change in pan information, a change in evaluation value of the automatic focusing, a change in aspect ratio, a change in extender lens to be inserted into an optical path in a case where an extender mechanism is provided, and a change in luminance of the picked up image in the focus detection range. Further, this embodiment has been described on whether to display or hide the focus detection range, but whether to display or hide the focus state may similarly be controlled. Further, this embodiment may be applied in the case of Mode B illustrated in FIG. 2 (mode in which the automatic focusing is operated when the AF switch 304 is ON).

According to this embodiment, the display control for the autofocus information is enabled based on the zoom operation status and the pan/tilt information, with the result that the operability is improved.

(Third Embodiment)

Hereinafter, referring to FIGS. 2, and 10 to 13, an image pickup apparatus according to a third embodiment of the present invention is described. The components having the same functions as those in the first and second embodiments are given the same reference symbols and description thereof is therefore omitted.

Figure 10:
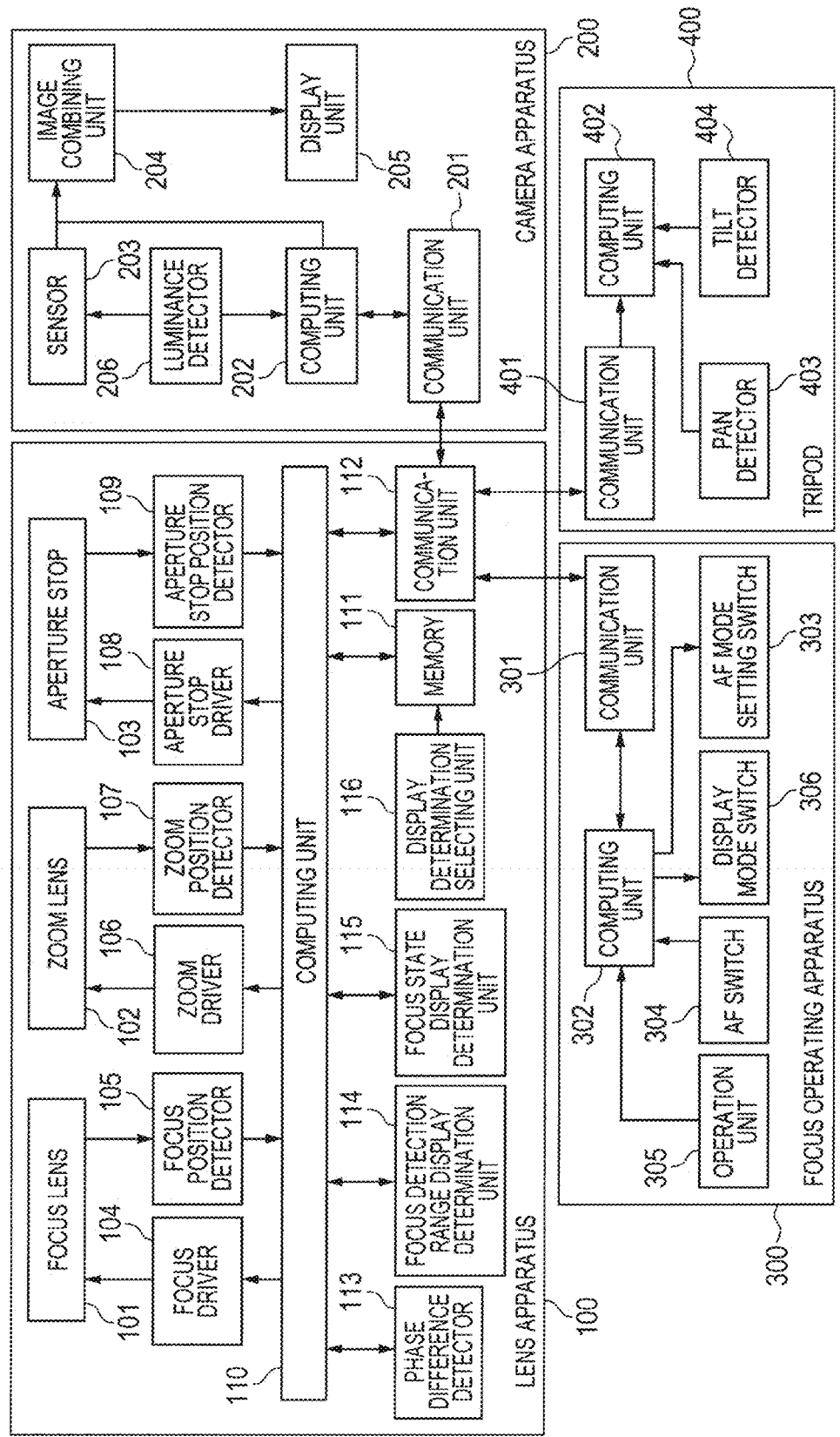
FIG. 10 is a block diagram illustrating a configuration according to a third embodiment of the present invention.

FIG. 10 is a functional block diagram of an image pickup system according to this embodiment. As compared to FIG. 6 used in the second embodiment, the image pickup system of FIG. 10 is different in that the lens apparatus 100 includes a display determination selecting unit 116 (condition setting unit), and that the focus operating apparatus 300 includes a display mode switch 306 (display mode setting unit).

The display determination selecting unit 116 is a setting unit including an interface operable by the user, and selects determination conditions for displaying the autofocus information. Details thereof are described with reference to FIGS. 11A and 11B. The display mode switch 306 of the focus operating apparatus 300 is a switch for switching modes of displaying and hiding the autofocus information, and details thereof are described with reference to FIG. 12.

As in the first and second embodiments, the autofocus operation modes are switchable with use of the AF mode setting switch 303 of the focus operating apparatus 300, and in this embodiment, it is supposed that Mode B (mode in which the automatic focusing is operated when the AF switch 304 is ON) illustrated in FIG. 2 is set.

FIGS. 11A and 11B are illustrations of an example of the display determination selecting unit 116. FIG. 11A illustrates an example of display of the display determination selecting unit 116, and FIG. 11B illustrates details of items of the display of the display determination selecting unit 116 illustrated in FIG. 11A. The user may set each condition effective (ON) and ineffective (OFF), and the focus detection range display determination unit 114 and the focus state display determination unit 115 use the conditions set to "ON" by the display determination selecting unit 116 for the determination of whether to display or hide the autofocus information.

FIG. 12 is a table showing setting contents of the display mode switch 306. In this embodiment, three setting items are provided. In an "ON" setting, the focus detection range and the focus state are both constantly displayed, and in an "OFF" setting, the focus detection range and the focus state are both constantly hidden. In a "Situation" setting, the focus detection range display determination unit 114, the focus state display determination unit 115, and the display determination selecting unit 116 function, and the focus detection range and the focus state are displayed or hidden in accordance with the conditions. In this embodiment, it is supposed that the "Situation" setting is selected.

Figure 13:
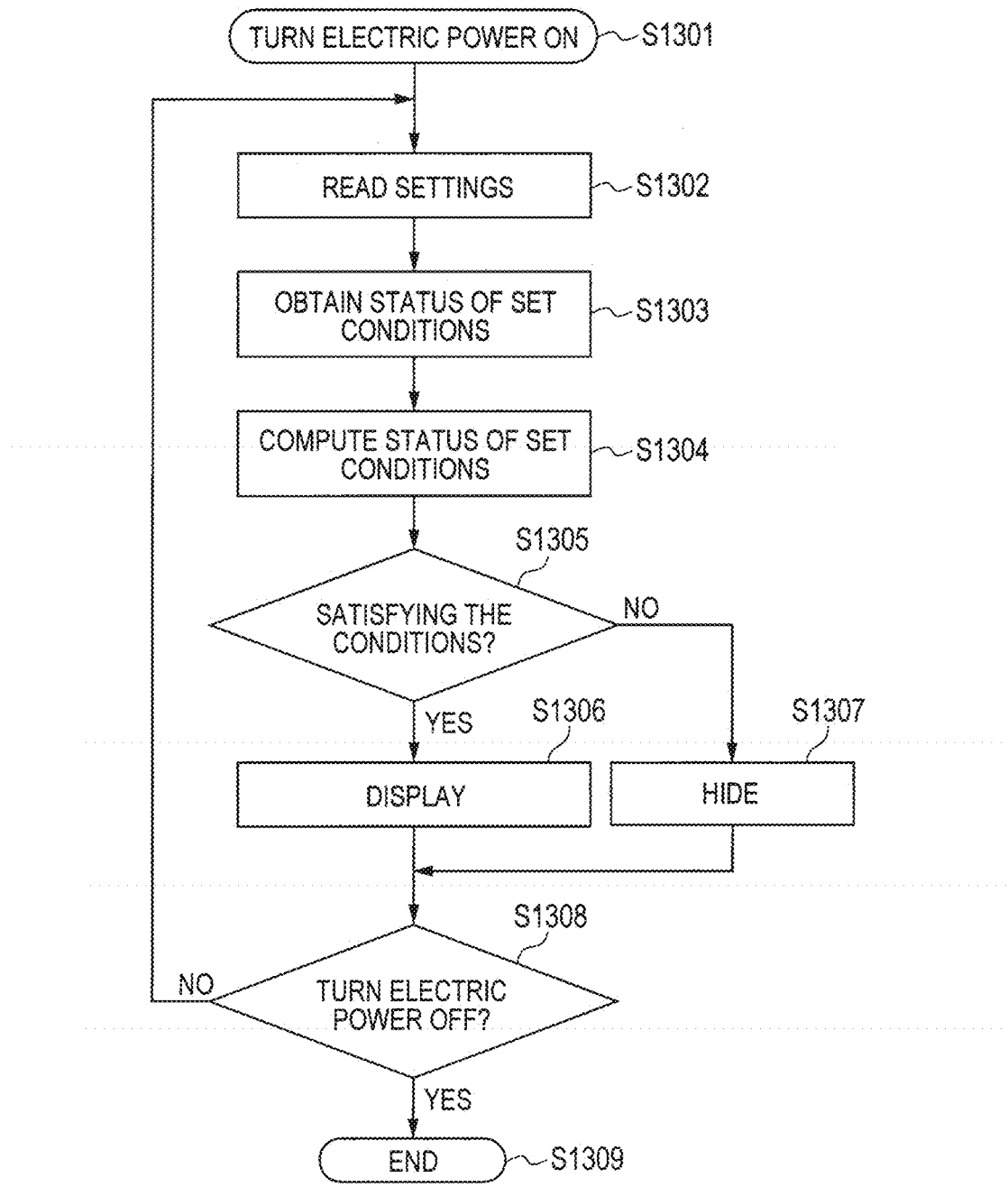
FIG. 13 is a flow chart according to the third embodiment of the present invention.
Figure 14A:
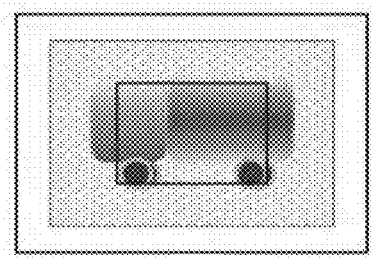
FIG. 14A is an illustration of an image pickup situation as viewed through the viewfinder according to the third embodiment of the present invention.
Figure 14B:
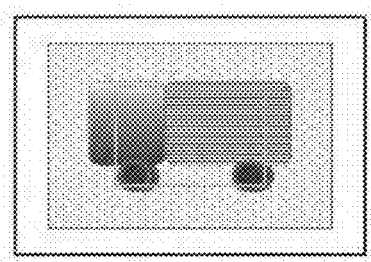
FIG. 14B is an illustration of the image pickup situation as viewed through the viewfinder according to the third embodiment of the present invention.
Figure 14C:
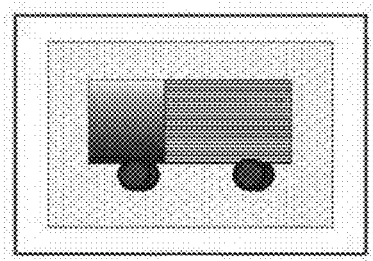
FIG. 14C is an illustration of the image pickup situation as viewed through the viewfinder according to the third embodiment of the present invention.
Figure 14D:
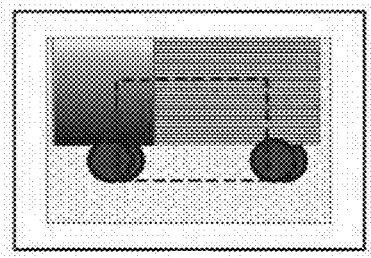
FIG. 14D is an illustration of the image pickup situation as viewed through the viewfinder according to the third embodiment of the present invention.
Figure 14E:
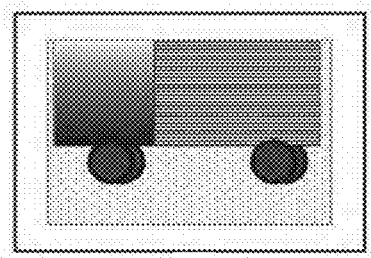
FIG. 14E is an illustration of the image pickup situation as viewed through the viewfinder according to the third embodiment of the present invention.

FIG. 13 is a flow chart of processing to be performed by the lens apparatus 100 according to this embodiment.

First, when electric power is turned ON in Step S1301, the processing proceeds to Step S1302. In Step S1302, setting items set to "ON" by the display determination selecting unit 116 are read from the memory 111, and the processing proceeds to Step S1303. In Step S1303, statuses of the set conditions read in Step S1302, that is, statuses of the items set to "ON", which are described in the "Detail" field of FIG. 11B, for example, whether or not zooming is performed, are obtained. Then, the processing proceeds to Step S1304. In Step S1304, all the statuses obtained in Step S1303 are logically computed, and the processing proceeds to Step S1305. In Step S1305, based on results obtained through the computation in Step S1304, it is determined whether or not the conditions are satisfied. When the conditions are satisfied, the processing proceeds to Step S1306. When the conditions are not satisfied, the processing proceeds to Step S1307. In Step S1306, a signal is output from the communication unit 112 to the communication unit 201 of the camera apparatus 200 so that the focus detection range and the focus state are displayed, and the processing proceeds to Step S1308.

In Step S1307, a signal is output from the communication unit 112 to the communication unit 201 of the camera apparatus 200 so that the focus detection range and the focus state are hidden, and the processing proceeds to Step S1308. In Step S1308, the status of the electric power is determined. When the electric power is OFF, the processing proceeds to Step S1309 to finish the processing. When the electric power is ON, the processing returns to Step S1302.

As described above, the user may arbitrarily select the determination conditions of whether to display or hide the autofocus information. Thus, the display control for the autofocus information in accordance with the image pickup situation is enabled independently of the operation apparatus. The present invention is not limited thereto, and the indication of the autofocus information may be set by providing a display determination item, in which the autofocus information is displayed depending on the image pickup situation, and a hiding determination item, in which the autofocus information is hidden depending on the image pickup situation, so that the display control is performed in accordance with the setting. The display determination selecting unit 116 illustrated in FIGS. 11A and 11B may be implemented by, for example, utilizing a function of a unit that functions to display function information of the lens apparatus 100 and select the functions, to thereby perform settings (lens function information display unit). Alternatively, the display determination selecting unit 116 may be implemented by switches provided individually.

This embodiment has been described by taking, as an example, a case where the set conditions of the display determination selecting unit illustrated in FIGS. 11A and 11B are used in common for the focus detection range indication and the focus state indication, but the present invention is not limited thereto. The effects of the present invention may be obtained also in a configuration in which the set conditions for the focus detection range indication and the set conditions for the focus state indication can be set independently. Specifically, the conditions of whether to display or hide all kinds of the focus information, such as the focus detection range and the focus state, may be set, in accordance with the any one of the settings of "constantly display," "constantly hide," and "display in accordance with conditions", or alternatively, any one of the settings of "constantly display," "constantly hide," and "display in accordance with conditions" may be set for each kind of the focus information individually. Settings of "constantly display part of focus information (constantly hide part of focus information)" and "display only part of focus information in accordance with conditions" may be employed as well.

According to this embodiment, the display control for the autofocus information is enabled based on the conditions selected by the user, with the result that the operability is improved.

(Fourth Embodiment)

Hereinafter, referring to FIGS. 2, 10 to 12, and 14A to 16, an image pickup apparatus according to a fourth embodiment of the present invention is described. The components having the same functions as those in the first to third embodiments are given the same reference symbols and description thereof is therefore omitted.

As in the third embodiment, FIG. 10 also illustrates a functional block diagram of a system according to this embodiment.

Similarly to the first to third embodiments, the autofocus operation modes are switchable with use of the AF mode setting switch 303 of the focus operating apparatus 300, and in this embodiment, it is supposed that Mode A illustrated in FIG. 2 is set. In this embodiment, similarly to the third embodiment, the statuses of the display determination selecting unit 116 are set as illustrated in FIGS. 11A and 11B. Further, similarly to the third embodiment, it is supposed that the "Situation" setting of FIG. 12 is selected as the setting of the display mode switch 306.

This embodiment provides the following feature. That is, the focus state to be displayed on the display unit 205 of the camera apparatus 200 is represented by a thickness, line type, density, color change, or blinking of the line of the frame indicating the focus detection range, or a combination thereof. Unlike the first to third embodiments, the focus state indication is not represented separately from the focus detection range indication.

FIGS. 14A to 14E are illustrations of an image pickup situation as viewed through the display unit 205 of the camera apparatus 200 according to this embodiment. FIGS. 14A to 14E illustrate, in time sequence, display at the time when the focusing operation is performed on a given object, and details thereof are described later.

FIG. 15 is a flow chart of processing to be performed by the lens apparatus 100 at the time of the autofocus operation according to this embodiment. The image pickup situation displayed on the display unit 205 of the camera apparatus 200 corresponds to a case where the autofocus operation is performed under a state illustrated in FIG. 14A, in which the object is out of focus.

When the autofocus operation is performed in Step S1501, the processing proceeds to Step S1502. In Step S1502, the focus state is obtained, and the processing proceeds to Step S1503. In Step S1503, the focusing status is determined. When the object is out of focus, the processing proceeds to Step S1504. When the object is in focus, the processing proceeds to Step S1506. In Step S1504, in accordance with the focus state obtained in Step S1502, it is determined whether or not the display method for the focus detection range needs to be updated. When the display method needs to be updated, the processing proceeds to Step S1505. When the display method does not need to be updated, the processing returns to Step S1502.

In Step S1505, a signal is output from the communication unit 112 to the communication unit 201 of the camera apparatus 200 so that the display method for the focus detection range is updated in accordance with the focus state, and the processing returns to Step S1502. At this time, the display unit 205 of the camera apparatus 200 is brought into a state illustrated in FIG. 14B, in which the automatic focusing is in operation, and the focus detection range is updated to be represented by a lightly colored line (updated so as to indicate that the object becomes closer to the in-focus state (closer to the out-of-focus state)).

In Step S1506, a signal is output from the communication unit 112 to the communication unit 201 of the camera apparatus 200 so that the focus detection range is updated to be hidden, and the processing proceeds to Step S1507 to finish the processing. At this time, the display unit 205 of the camera apparatus 200 is brought into an in-focus state illustrated in FIG. 14C.

FIG. 16 is a flow chart of processing to be performed by the lens apparatus 100 in a case where a zoom operation is performed according to this embodiment. The image pickup situation displayed on the display unit 205 of the camera apparatus 200 corresponds to a case where the zoom lens is operated under a state of FIG. 14C.

When the zoom operation is performed in Step S1601, the processing proceeds to Step S1602. In Step S1602, a position of the zoom lens is obtained and the processing proceeds to Step S1603. In Step S1603, it is determined whether or not there is change in position of the zoom lens. When there is no change, the processing proceeds to Step S1604. When there is a change, the processing proceeds to Step S1606. In Step S1604, a time period is measured, and the processing proceeds to Step S1605.

In Step S1605, the flow is branched based on the time period measured in Step S1604. When a measured time period (time period since the change in zoom position is stopped) T is smaller than a first predetermined time period T1 (T<T1), the processing returns to Step S1602. When the measured time period T is equal to or larger than the first predetermined time period T1 and equal to or smaller than a second predetermined time period T2 (provided that T2>T1) (T1≤T≤T2), the processing proceeds to Step S1606. Further, when the measured time period T is larger than the second predetermined time period T2 (T2<T), the processing proceeds to Step S1607. In Step S1606, a signal is output from the communication unit 112 to the communication unit 201 of the camera apparatus 200 so that the focus detection range indication is updated, and the processing returns to Step S1602. At this time, the display unit 205 of the camera apparatus 200 is brought into a state illustrated in FIG. 14D, in which the zooming is in operation. In Step S1607, a signal is output from the communication unit 112 to the communication unit 201 of the camera apparatus 200 so that the focus detection range is hidden, and the processing proceeds to Step S1608. At this time, the display unit 205 of the camera apparatus 200 is brought into a state illustrated in FIG. 14E, and the processing is finished.

In this embodiment, based on information on the focus detection range and the focus state input to the computing unit 110 of the lens apparatus 100, the computing unit 110 may create information on the focus detection range indication to be displayed on the display unit 205 (including density, color, and line type), and the created information may be output to the display unit 205 of the camera apparatus 200 via the communication units 112 and 201. Alternatively, when the focus information is displayed on the display unit 205, the focus detection range and the focus state may be output to the computing unit 202 of the camera apparatus 200 via the communication units 112 and 201. Based on the information on the focus state thus transferred, the computing unit 202 may create information on the focus detection range indication to be rendered on the display unit (including thickness, line type, color, and color density of the line surrounding the focus detection range), and the created information may be output to the display unit 205.

As described above, the display method for the focus detection range is changed depending on the image pickup situation, and thus the user can perform the display control for the autofocus information as appropriate in accordance with the image pickup situation.

According to this embodiment, the display control for the autofocus information is enabled based on the conditions selected by the user, with the result that the operability is improved.

The above-mentioned embodiments have been described by taking, as an example, a case where the focus state and the focus detection range are displayed on the display unit 205 of the camera apparatus 200, but the present invention is not limited thereto. Similar effects may be obtained also in a configuration in which the display unit is provided independently to an apparatus other than the camera apparatus, or in a configuration in which the display unit is provided to the lens apparatus.

The above-mentioned embodiments have been described by taking, as an example, a case where the focus state display determination unit 115 is provided to the lens apparatus 100, but the present invention is not limited thereto. It should be understood that the effects of the present invention may be obtained also in a case where the focus state display determination unit 115 is provided on the camera apparatus 200 side.

In the above-mentioned embodiments, the information on whether or not to display the focus detection range and the focus state is transmitted from the lens apparatus to the camera apparatus so that the focus detection range and the focus state are displayed or hidden, but the present invention is not limited thereto. For example, when the camera apparatus does not receive the information on the focus detection range and the focus state from the lens apparatus, the information on the focus detection range and the focus state may be hidden.

The above-mentioned embodiments have been described by taking, as an example, a case where the signal for displaying the focus information is output from the communication unit of the lens apparatus (focus information output unit) to the display unit provided to the camera apparatus, but the present invention is not limited thereto. It should be understood that the effects of the present invention may be obtained also in a case where the signal for displaying the focus information is, for example, output from the communication unit of the camera apparatus (focus information output unit) to a display unit provided outside the camera apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-064163, filed Mar. 23, 2011, which is hereby incorporated by reference herein in its entirety.

What is claimed is:

1. A lens apparatus comprising:
 a focus lens;
 a focus detector;
 an automatic focusing unit that controls driving of the focus lens based on a focus detection result obtained from the focus detector;
 an output unit that outputs focus information including a focus detection range within which the automatic focusing unit performs focusing and a focus state obtained based on the focus detection result on a display unit that displays the focus information superimposed on a picked-up image obtained by the lens apparatus;
 a display determination unit that determines whether or not to display the focus information on the display unit;
 an input unit that receives pan/tilt information through electrical communication; and
 a condition setter that sets each of a plurality of determination conditions enabled or disabled,
 wherein the output unit outputs a signal to display the focus information based on a determination result of the display determination unit to the display unit,
 wherein the display determination unit determines to display the focus information on the display unit when the input unit receives the pan/tilt information indicating that the lens apparatus is panned or tilted,
 wherein the plurality of determination conditions each are a condition to determine whether or not the lens apparatus is panned/tilted, and
 wherein the condition setter is a lens function information display unit that displays and sets function information of the lens apparatus.

2. The lens apparatus according to claim 1, further comprising:
 a zoom lens,
 wherein the display determination unit determines to display the focus information on the display unit when a focal length of the lens apparatus is changed and the picked-up image is changed.

3. The lens apparatus according to claim 1, further comprising:
 an extender mechanism,
 wherein the display determination unit determines to display the focus information on the display unit when an extender lens positioned on an optical path is changed and the picked-up image is changed.

4. The lens apparatus according to claim 1, wherein the display determination unit determines not to display the focus information on the display unit when a subject is in-focus.

5. The lens apparatus according to claim 4, wherein after elapsing a predetermined time, the display determination unit outputs, to the output unit, a result of determination that the focus information is not displayed on the display unit.

6. The lens apparatus according to claim 1, wherein the display determination unit determines to not display the focus information on the display unit when the lens apparatus is neither panned nor tilted for a predetermined time period after the display determination unit determined to display the focus information on the display unit.

7. The lens apparatus according to claim 1, wherein the focus state included in the focus information output from the output unit indicates a degree of focusing.

8. The lens apparatus according to claim 1, wherein the input unit receives the pan/tilt information output from an external device.

9. An image pickup apparatus comprising:
 a lens apparatus; and
 a sensor that picks up an optical image of a subject formed by the lens apparatus, wherein the lens apparatus comprises:
a focus lens;
a focus detector; and
an automatic focusing unit that controls driving of the focus lens based on a focus detection result obtained from the focus detector;
an output unit that outputs focus information including a focus detection range within which the automatic focusing unit performs focusing and a focus state obtained based on the focus detection result on a display unit that displays the focus information superimposed on a picked-up image obtained by the lens apparatus;
a display determination unit that determines whether or not to display the focus information on the display unit;
an input unit that receives pan/tilt information through electrical communication; and
a condition setter that sets each of a plurality of determination conditions enabled or disabled,
wherein the output unit outputs a signal to display the focus information based on a determination result of the display determination unit to the display unit,
wherein the display determination unit determines to display the focus information on the display unit when the input unit receives the pan/tilt information indicating that the lens apparatus is panned or tilted,
wherein the plurality of determination conditions each are a condition to determine whether or not the lens apparatus is panned/tilted, and
wherein the condition setter is a lens function information display unit that displays and sets function information of the lens apparatus.

10. The image pickup apparatus according to claim 9, wherein:
the lens apparatus is a zoom lens, and
the display determination unit determines to display the focus information on the display unit when a focal length of the lens apparatus is changed and the picked-up image is changed.

11. The image pickup apparatus according to claim 9, wherein:
the lens apparatus includes an extender mechanism having an extender lens,
the display determination unit determines to display the focus information on the display unit when the extender lens positioned on an optical path is changed and the picked-up image is changed.

12. The image pickup apparatus according to claim 9, wherein:
the lens apparatus further includes a focus controller that operates the lens apparatus,
the focus controller includes a display mode setter that sets the display unit to one of a mode to display the focus information constantly, a mode not to display constantly, or a mode to display in accordance with conditions, and
the display determination unit functions only when the display mode setter is set as the mode to display in accordance with conditions.

13. The image pickup apparatus according to claim 9, further comprising:
a luminance detector that detects luminance of the picked-up image in a focus detection range,
wherein the display determination unit determines to display the focus information on the display unit when luminance information detected by the luminance detector is changed.

14. The image pickup apparatus according to claim 9, wherein the display determination unit determines to display the focus information on the display unit when an aspect ratio of the image pickup apparatus is changed.

* * * * *